(12) United States Patent
Thamarassery Mekkat et al.

(10) Patent No.: US 12,169,718 B2
(45) Date of Patent: Dec. 17, 2024

(54) SYSTEMS, METHODS AND APPARATUS FOR SPECULATIVE ELIMINATION OF LOAD INSTRUCTION

(71) Applicant: Intel Corporation, Santa Clara, CA (US)

(72) Inventors: Vineeth Thamarassery Mekkat, San Jose, CA (US); Sebastian Christoph Albert Winkel, Los Altos, CA (US); Rangeen Basu Roy Chowdhury, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 17/304,775

(22) Filed: Jun. 25, 2021

(65) Prior Publication Data

US 2022/0413870 A1    Dec. 29, 2022

(51) Int. Cl.
*G06F 9/38* (2018.01)
*G06F 8/41* (2018.01)
(Continued)

(52) U.S. Cl.
CPC .......... *G06F 9/3861* (2013.01); *G06F 8/4435* (2013.01); *G06F 9/30043* (2013.01);
(Continued)

(58) Field of Classification Search
CPC .. G06F 9/3861; G06F 8/4435; G06F 9/30043; G06F 9/30101; G06F 9/382; G06F 9/5016; G06F 9/30072; G06F 9/3867
See application file for complete search history.

(56) References Cited

U.S. PATENT DOCUMENTS 6,011,908 A * 1/2000 Wing ................... G06F 9/3861
                                                      712/E9.06
6,112,019 A * 8/2000 Chamdani ............ G06F 9/3856
                                                      712/214
(Continued)

OTHER PUBLICATIONS

"Spec CPU2017: Performance, Energy And Event Characterization On Modern Processors" dated Jun. 22, 2108, by Ranjan Hebbar Seethur Raviraj, available at www.researchgate.net/publication/332543387_SPEC_CPU2017_PERFORMANCE_ENERGY_AND_EVENT_CHARACTERIZATION_ON_MODERN_PROCESSORS/link/5cbcc0d24585156cd7a8c497/download (54 pages: 1-16, 49-51, 155-157).

*Primary Examiner* — Shawn Doman
(74) *Attorney, Agent, or Firm* — Nicholson De Vos Webster & Elliott LLP

(57) ABSTRACT

An apparatus comprises decoder circuitry to decode an instruction that includes an opcode to indicate a protected load operation, a source field for source memory address information, and a destination field to identify a destination register. The apparatus also comprises memory to store an allocate load-protect (LP) data structure with an entry for the identified destination register. The entry comprises an IP field and a status field. The apparatus also comprises load elision circuitry to (a) use the allocate LP data structure to determine whether the identified destination register has active status for the IP; (b) in response to determining that the identified destination register has active status for the IP, cause the instruction to be elided; and (c) in response to determining that the identified destination register does not have active status for the IP, cause the instruction to be executed. Other embodiments are described and claimed.

22 Claims, 10 Drawing Sheets

(51) Int. Cl.
 G06F 9/30 (2018.01)
 G06F 9/50 (2006.01)
(52) U.S. Cl.
 CPC .......... G06F 9/30101 (2013.01); G06F 9/382 (2013.01); G06F 9/5016 (2013.01)

(56) References Cited

U.S. PATENT DOCUMENTS

| | | | | |
|---|---|---|---|---|
| 6,202,204 | B1* | 3/2001 | Wu | G06F 8/433 712/E9.05 |
| 2017/0185407 | A1* | 6/2017 | Shwartsman | G06F 12/0875 |
| 2018/0095765 | A1* | 4/2018 | Mekkat | G06F 8/52 |
| 2022/0100518 | A1* | 3/2022 | Tomei | G06F 9/3838 |

\* cited by examiner

Load-Protect Instruction 64

| OpCode | Destination Register | Source Address |
|---|---|---|
| LD-PROT | Rx | [A] |

FIG. 2

Allocate LPT 50

| Index | Active (1b) | IP (64b) |
|---|---|---|
| R0 | | |
| R1 | | |
| ... | | |
| R15 | | |

Retire LPT 52

| Index | Active (1b) | Address (64b) |
|---|---|---|
| R0 | | |
| R1 | | |
| ... | | |
| R15 | | |

FIG. 3

SYSTEMS, METHODS AND APPARATUS FOR SPECULATIVE ELIMINATION OF LOAD INSTRUCTION

TECHNICAL FIELD

The present disclosure pertains in general to data processing systems and in particular to technology for optimizing execution of instruction streams that involve load instructions.

BACKGROUND

Many processors support load instructions for loading data from memory to a register and store instructions for storing data from a register to memory. The operation of loading data from memory to a register may be referred to as a "memory-to-register operation" or simply as a "load," and the operation of storing data from a register to memory may be referred to as a "register-to-memory operation" or simply as a "store." When a compiler generates object code from source code, the compiler may perform various optimizations. For instance, to eliminate redundant loads, a compiler can perform memory optimizations such as loop invariant code motion (LICM) to move a load out of a loop, to be executed instead before the loop is entered.

However, if there is a store that might be executed within the loop (a "potential store"), and that potential store could alias with that load (the "candidate load"), that store may be referred to as a "may-alias store." In other words, a may-alias store is a store that may update a memory location that is also involved in a load. For instance, if a loop includes a load instruction to load data from address "A" to register "X" and a store instruction to store data at address "B," and it may turn out during execution out that "B" equals "A," that store instruction would be a may-alias store.

If a may-alias store is present, a compiler may optimize conservatively and not perform LICM on the load instruction, because there is no way to detect and recover from a fault in case the addresses alias during runtime.

BRIEF DESCRIPTION OF THE DRAWINGS

Features and advantages of the present invention will become apparent from the appended claims, the following detailed description of one or more example embodiments, and the corresponding figures, in which:

FIG. 2 presents a table to illustrate an example embodiment of a load-protect instruction to be executed in the data processing system of FIG. 1.

FIG. 3 presents an example embodiment of an allocate load-protection table and an example embodiment of a retire load-protection table to be used by the data processing system of FIG. 1.

DETAILED DESCRIPTION

Figure 1:
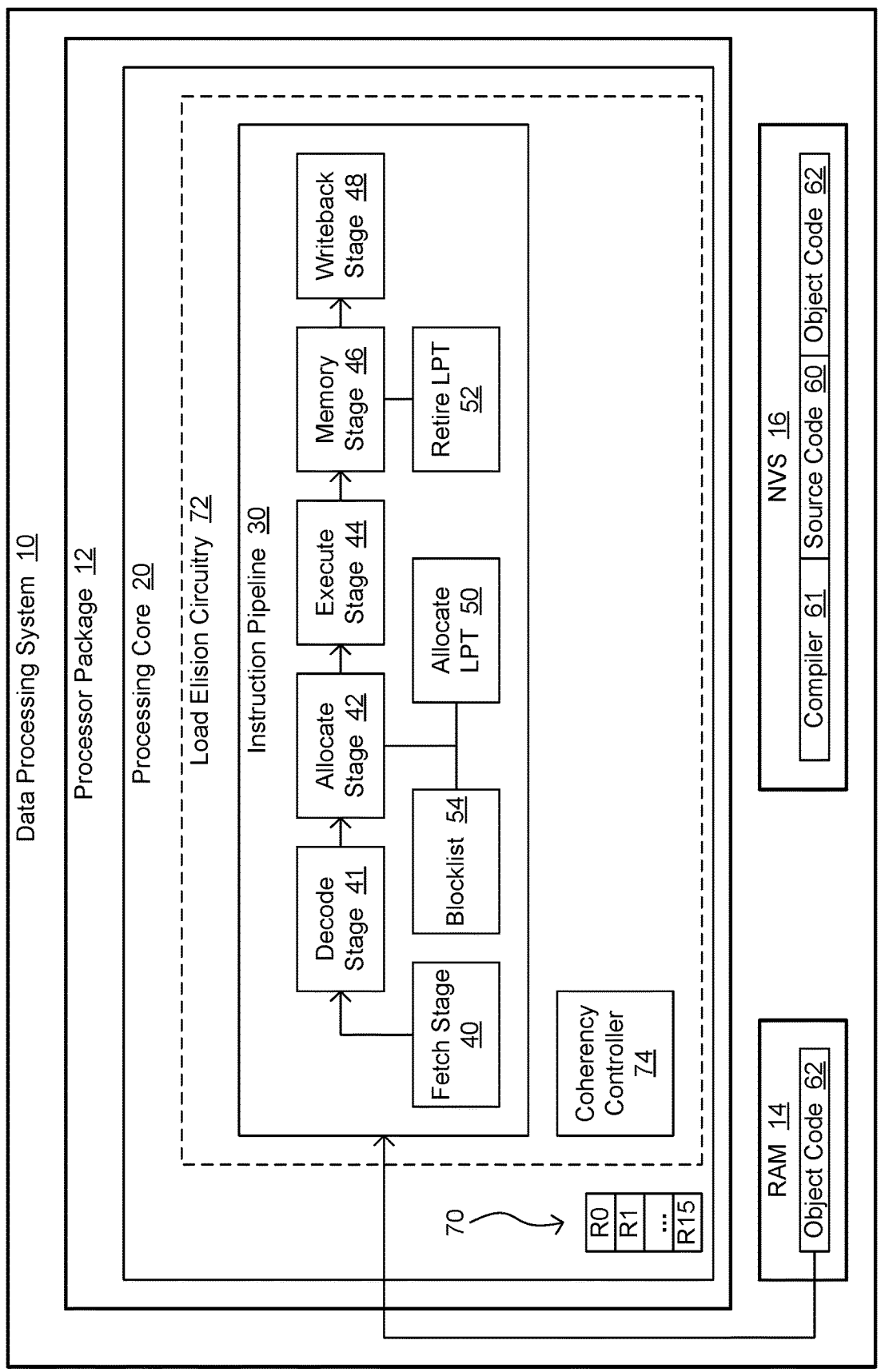
FIG. 1 is a block diagram depicting an example embodiment of a data processing system with technology for optimizing memory-to-register operations.

A load instruction is an instruction for copying data from a specified memory location to a specified register. In various embodiments, a load instruction may be specified using a name or operation code ("opcode") such as "MOVE", "MOV", "LOAD", "LD", etc. A store instruction is an instruction for copying data from a specified register to a specified memory location. In various embodiments, a store instruction may be specified using a name or opcode such as "MOVE", "MOV", "STORE", "ST", etc. Other names, labels or opcodes may be used to denote load and store instructions in other embodiments.

The present disclosure describes a processor which provides architectural support for a new type of load instruction that can be used to eliminate redundant loads under may-alias store conditions. The architectural support for this new type of load instruction enables the processor to maintain correctness under address alias conditions by enabling runtime detection of and recovery from address alias conditions. The present disclosure refers to this new type of load instruction as a "protected load instruction" or a "load-protect instruction," and the present disclosure uses the opcode LD-PROT to identify that instruction. However, in other embodiments, other names and/or opcodes may be used to refer to such an instruction, including without limitation opcodes such as MOVPROT, MOV-PROT, MOV.PROT, LOADPROT, LOAD-PROT, LOAD.PROT, LDPROT, etc. Also, for ease of understanding, this disclosure may use pseudocode with alphanumeric syntax to depict source code instructions and object code instructions. However, in practice, the source code and/or the object code may actually be encoded using different techniques. For instance a compiler may use numeric machine language to constitute the object code.

As described in greater detail below, when generating object code from source code, a compiler may replace potentially redundant load instructions with load-protect instructions. And when a processor in a data processing system executes that object code, the processor may skip or elide execution of the load-protect instructions in certain circumstances, thereby enabling the data processing system to realize better performance, relative to a conventional data processing system. As described in greater detail below, the processor includes hardware support to track the source addresses for load-protect instructions which have been executed, and to detect any correctness violation due to a may-alias store that matches any such address. The processor also includes hardware recovery support to properly handle such situations, to provide forward progress.

Furthermore, a compiler may replace conventional load instructions with load-protect instructions in a way that enables a processor that does not fully support load-protect instruction to simply treat the load-protect instructions as load instructions. For instance, the source code may include the following instructions:

L1:

...

LD Rx, [A]

...

ST [B], Ry

...

JCC L1

And when compiling that source code, the compiler may generate corresponding optimized object code with the following instructions, in which the LD opcode has been replaced with the LD-PROT opcode:

L1:

...

LD-PROT Rx, [A]

...

ST [B], Ry

...

JCC L1

As described in greater detail below, when a processor executes this optimized code, the processor will execute the first instance of the LD-PROT in some respects as a conventional load instruction, fetching data from a data cache unit (DCU) or getting data forwarded from an older store, and loading that data into the specified destination register. However, the processor will also add information concerning the LD-PROT instruction (e.g., the instruction pointer (IP) and the source address) to one or more tables to aid with elimination of later instances or iterations of the load, and to enable detection of faults and recovery. Consequently, the processor may eliminate or skip further instances or iterations of this load before execution. However, if this optimized code is executed by a processor that does not fully support load-protect instructions, the processor may simply treat the load-protect instruction as a load instruction.

FIG. 1 is a block diagram depicting an example embodiment of a data processing system 10 with technology for optimizing memory-to-register operations. As described in greater detail below, that technology includes features such as load elision circuitry 72 within a processor package 12 in data processing system 10. In particular, in the embodiment of FIG. 1, processor package 12 includes at least one processing core 20 that includes load elision circuitry 72. Processor package 12 may also be referred to simply as "processor" 12.

As illustrated, data processing system 10 also includes random access memory (RAM) 14 and non-volatile storage (NVS) 16 in communication with processor 12. NVS 16 includes source code 60 and a compiler 61. Compiler 61 may use a process like the one described below with regard to FIG. 4 to generate optimized object code 62, based on source code 60. In one embodiment or scenario, compiler 61 saves object code 62 to NVS 16, and then processor 12 copies object code 62 into RAM 14 for execution.

In the embodiment of FIG. 1, processing core 20 includes various execution resources such as an instruction pipeline 30 and a set of registers 70 (e.g., general purpose registers R0-R15, which may be logical registers). Instruction pipeline 30 provides for various different stages of execution, including a fetch stage 40 for fetching instructions from memory, a decode stage 41 for getting register values and decoding control information, an allocate stage 42 for allocating resources to be used by an instruction, an execute stage 44 for executing arithmetic operations and calculating addresses, a memory stage 46 for performing memory operations such as load and store, and a writeback stage 48 for writing or committing results to registers. In one embodiment, decode stage 41 is implemented in processing core 20 as decoder circuitry for decoding instructions. Each such instruction may include a field for an opcode. Similarly, allocate stage 42 may be implemented in processing core 20 as allocation circuitry for allocating resources for each instruction according to its opcode, and execute stage 44 may be implemented in processing core 20 as execution circuitry for executing decoded instructions according to their respective opcodes. In some embodiments, the execution circuitry may also include stages such as memory stage 46 and writeback stage 48. Also, in some embodiments, the instruction pipeline may include stages or subdivisions with different names. For instance, the instruction pipeline may be subdivided into a front-end unit (FEU), an allocation unit (AU), an integer execution unit (IEU), a memory execution unit (MEU), and a vector processing unit (VPU). In such embodiments, one or more of the operations described herein may be performed by one or more of those subdivisions, as appropriate. For instance, a processor may include load elision circuitry which interacts with and/or resides within instruction-pipeline stages such as those illustrated in FIG. 3.6 of the thesis paper entitled "SPEC CPU2017: Performance, Energy And Event Characterization On Modern Processors" dated Jun. 22, 2108, by Ranjan Hebbar Seethur Raviraj ("CPU2017"). For example, CPU2017 (which is available on the internet from ResearchGate GmbH) illustrates an "instruction decode queue" (IDQ) stage that corresponds to decode stage 41, as well as an "Allocate/Rename/Retire/MoveElimination/ZeroIdion" stage that corresponds to allocate stage 42 of the present disclosure. CPU2017 also illustrates a scheduler, various execution units, etc. For instance, CPU2017 shows ports 2-4 and port 7 feeding the load and store execution units.

In the embodiment of FIG. 1, processing core 20 also includes a coherency controller 74, which is illustrated within load elision circuitry 72, to indicate that at least some of the load elision circuitry 72 resides within coherency controller 74. However, other embodiments may use different arrangements. For instance, in another embodiment, some or all of the coherency controller may reside outside of the load elision circuitry. In the embodiment of FIG. 1, processing core 20 uses load elision circuitry 72 to execute load-protect instructions, and processing core 20 uses coherency controller 74 to detect and recover from address alias conditions. As described in greater detail below, processing core 20 also uses an allocate load-protection table (LPT) 50 and a retire LPT 52 to support execution of load-protect instructions and recovery from address alias conditions.

In FIG. 1, load elision circuitry 72 is illustrated using a box with dashed lines outside of and surrounding instruction pipeline 30, to reflect an embodiment in which some (or all) of the load elision circuitry is implemented as part of instruction pipeline 30, for instance as part of decode stage 41, allocate stage 42, execute stage 44, memory stage 46, and/or writeback stage 48. However, in other embodiments, some or all of the load elision circuitry may be arranged differently. For instance, some of the load elision circuitry may be implemented as one or more blocks that communicate with one or more stages of the instruction pipeline.

As described in greater detail below, when allocate stage 42 in instruction pipeline 30 allocates resources for executing a load-protect instruction, load elision circuitry 72 looks for an entry in allocate LPT 50 that matches the logical destination register (LDR) of the load-protect instruction. If that entry is active, and if the IP in that entry matches the IP of the load-protect instruction, load elision circuitry 72 marks that instance or iteration of the load-protect instruction for elimination or elision, to cause execute stage 44 to skip execution of that instruction. In one embodiment or scenario, processor 12 may handle instructions marked for elimination by using move-elimination or "mov-elimination" features of processor 12.

However, if the relevant entry in allocate LPT 50 is inactive or if the IPs do not match, load elision circuitry 72 establishes new protection for this load-protect instruction, overwriting any existing protection. Also, if a non-load instruction writes to an actively protected LDR, load elision circuitry 72 will clear the corresponding protection in allocate LPT 50 (e.g., by marking the relevant entry as inactive). Also, the above actions may happen in program order (at or after allocation) to maintain correctness.

A load-protect instruction that is not elided during allocation reaches memory stage 46 (or the MEU) like a normal load. On dispatch of the load to memory stage 46, load elision circuitry 72 adds the source address to retire LPT 52. Furthermore, load elision circuitry 72 checks retire LPT 52 for all stores in the loop to identify aliasing cases. On identifying an aliasing case, load elision circuitry 72 marks the store instruction for fault at retirement.

When a faulting store is ready to retire, processor 12 executes fault processing which also clears the relevant entries in both LPTs, and instruction pipeline 30 is restarted from the faulting store. Consequently, any younger load-protect instruction that should get data from the faulting store will not be elided, since the relevant LPT entries have been reset. Thus, in the event of aliasing, the faults are handled transparently from a software point of view.

In addition, the IPs of repeatedly faulting load-protect instructions may be added to a blocklist 54, so that they are not considered for protection or elimination.

FIG. 2 presents a table to illustrate an example embodiment of a load-protect instruction 64 to be executed by processor 12. In the illustrated embodiment, load-protect instruction 64 includes an opcode of "LD-PROT", a destination register (or LDR) of "Rx", and a source address of "[A]". For instance, compiler 61 may convert a load instruction from source code 60 into a load-protect instruction in object code 62, and compiler 61 may use the following syntax to denote that data is to be copied from address [A] to register (or LDR) R0:

LD-PROT R0, [A]

Alternatively, as indicated above, compiler 61 may generate numeric machine language code that corresponds to the above syntax, to denote the load-protect instruction in the object code.

As described in greater detail below, in some circumstances, the load-protect instruction causes processor 12 to copy the data from the specified source address to the specified LDR. However, in other circumstances (e.g., after the data has already been copied to the destination register), processor 12 skips execution of that load-protect instruction. For purposes of this disclosure, the process of skipping, suppressing, or eliminating execution of a load instruction (e.g., a load-protect instruction) may be referred to as "load elision." As described in greater detail below, load elision circuitry 72 may use allocate LPT 50 and retire LPT 52 to track load-protect instructions that have been executed, to elide redundant load-protect instructions, and to detect address alias conditions.

FIG. 3 presents an example embodiment of allocate LPT 50 and an example embodiment of retire LPT 52. In one embodiment, allocate LPT 50 includes an entry for each of registers 70, with each entry including a 1-bit status field or flag to indicate whether that register is active and a 64-bit IP field to identify the IP value for (i.e., the address of) the instruction that last loaded data into that register. As illustrated, the status field may also be referred to as an "active" field. As described in greater detail below, load elision circuitry 72 updates allocate LPT 50 to mark a register as active and to record the associated IP in conjunction with executing a load-protect instruction involving that register.

In one embodiment, retire LPT 52 also includes an entry for each of registers 70. Each entry includes a 1-bit status (or "active") field or flag and a 64-bit address field. Load elision circuitry 72 updates retire LPT 52 to mark a register as active and to record the source address for the data that was loaded into that register in conjunction with executing a load-protect instruction involving that register. Further details on features such as load elision circuitry 72, allocate LPT 50, and retire LPT 52 are provided below with regard to FIGS. 5A-5B.

In other embodiments, an allocate LPT and a retire LPT may be implemented using data structures other than tables. For instance, the entries may be stored in an array, in a linked list, in a record, in a directory, etc. Accordingly, for purposes of this disclosure, an allocate LPT may be referred to more generally as an "allocate load-protection (LP) data structure," and a retire LPT may be referred to more generally as a "retire LP data structure."

Figure 4:
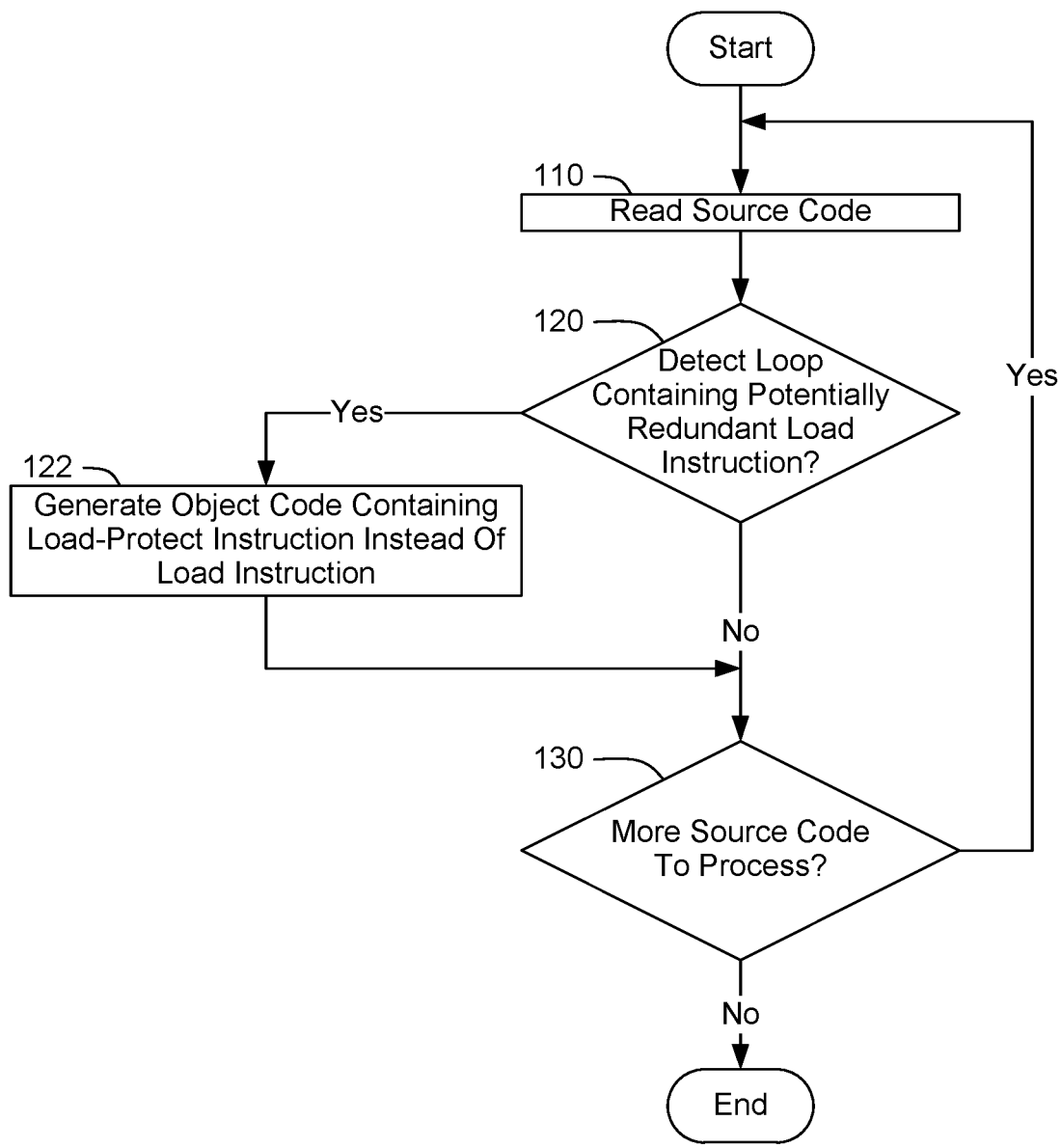
FIG. 4 presents a flowchart of an example embodiment of a process for generating object code with optimized memory-to-register operations.

FIG. 4 presents a flowchart of an example embodiment of a process for generating object code with optimized memory-to-register operations. For example, compiler 61 may use the process of FIG. 4 to generate object code 62 based on source code 60. The process of FIG. 4 may start with compiler 61 reading source code 60, as shown at block 110. As shown at block 120, compiler 60 may then determine whether source code 60 includes a loop that contains at least one load instruction that could be redundant when the loop is executed. If such a load instruction is detected, compiler 61 may generate object code that includes a load-protect instruction instead of or in place of that load instruction, as shown at block 122. As shown at block 130, compiler 61 may then determine whether there is more source code to process. If there is, the process may return to block 110, with compiler 61 reading more source code and converting any potentially redundant load instructions to load-protect instructions, as indicated above. Compiler 61 may also generate other kinds of instructions for object code 62, based on source code 60, using more or less conventional compilation techniques. And the process may end once compiler 61 has finished analyzing source code 60 and generating corresponding object code 62.

Subsequently, data processing system 10 may copy object code 62 from NVS 16 to RAM 14, and processor 12 may begin executing object code 62, using features such as load elision circuitry 72 and coherency controller 74 to execute and/or skip load-protect instructions and to handle address alias conditions, as described in greater detail below.

Figure 5A:
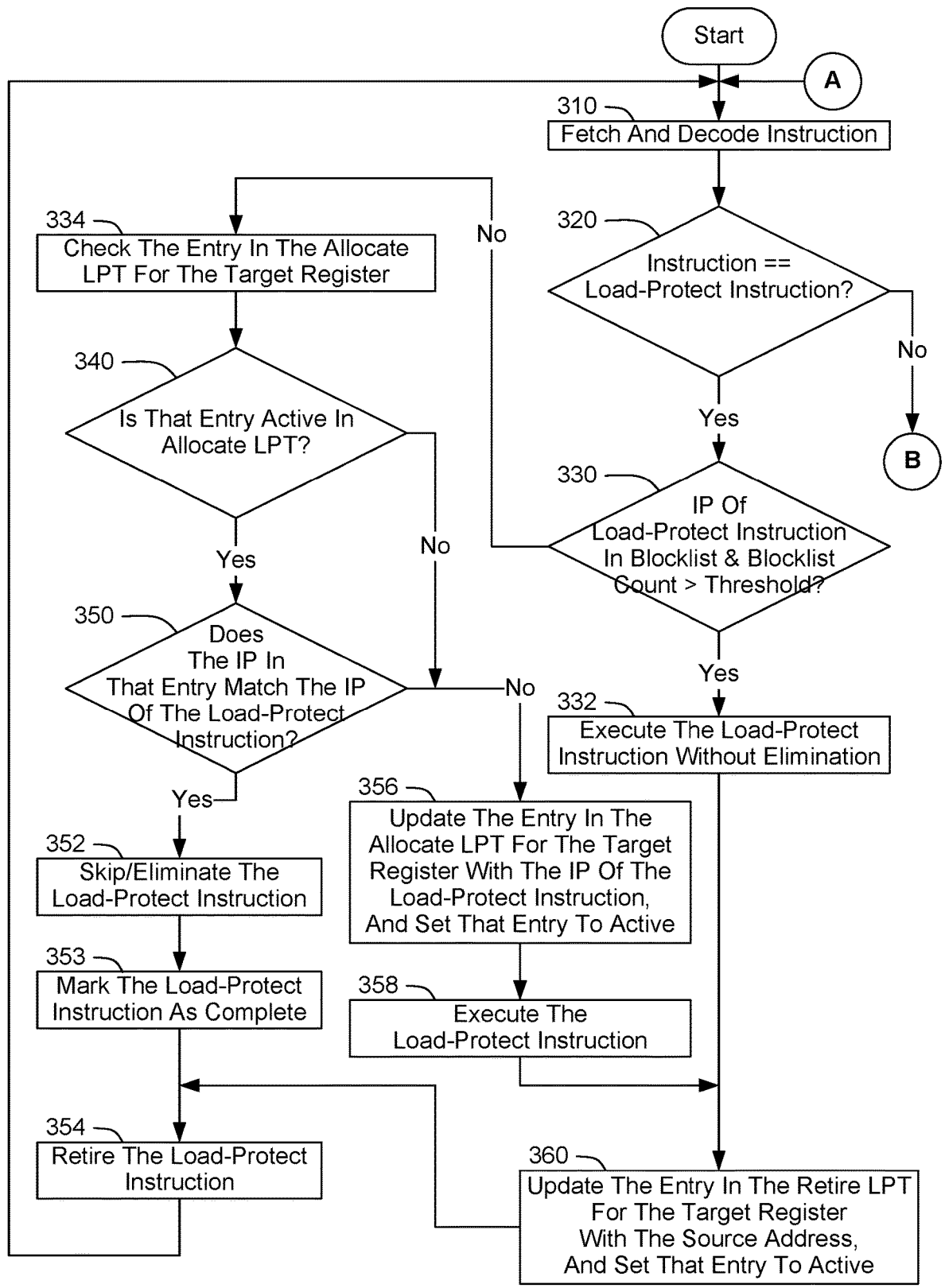
FIGS. 5A-5B present a flowchart of an example embodiment of a process for performing optimized memory-to-register operations.
Figure 5B:
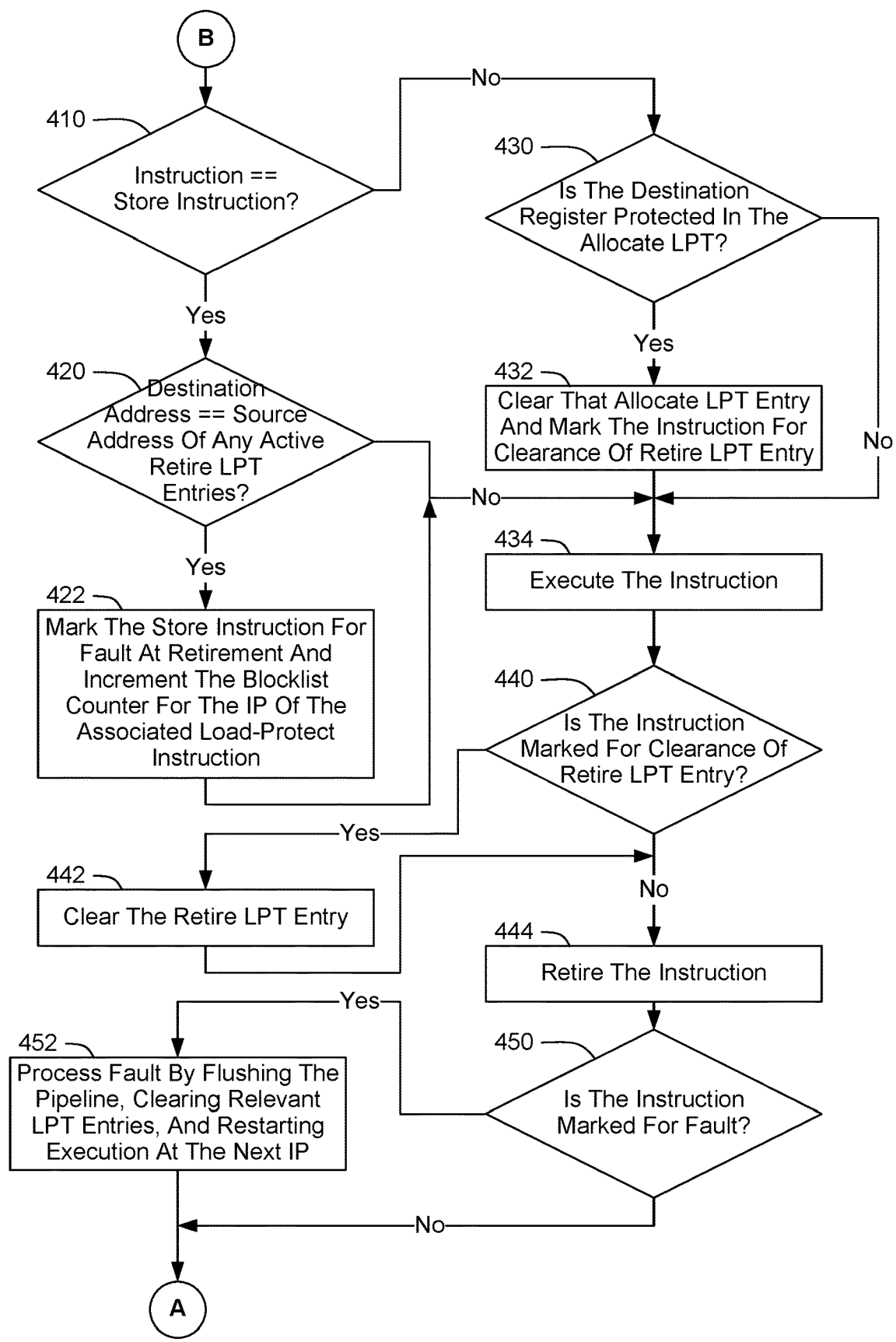

FIGS. 5A-5B present a flowchart of an example embodiment of a process for performing optimized memory-to-register operations. That process is described in connection with a hypothetical scenario involving data processing system 10 executing object code 62 after compiler 61 has compiled source code 60 into object code 62 and included load-protect instructions in object code 62, as indicated above.

The process of FIG. 5A may begin with fetch stage 40 of instruction pipeline 30 fetching an instruction from object code 62 and decode stage 41 decoding that instruction, as shown at block 310. As shown at block 320, load elision circuitry 72 may also determine whether the decoded instruction is a load-protect instruction. If the instruction is not a load-protect instruction, the process may pass through page connector B to FIG. 5B, and instruction pipeline 30 may proceed to process that instruction as described in greater detail below.

However, if the instruction is a load-protect instruction, load elision circuitry 72 may then consult blocklist 54 to determine whether the IP for that load-protect instruction is included in blocklist 54, and if so, whether a counter for that IP is greater than (or greater than or equal to) a predetermined threshold, as shown at block 330. Those operations may be performed as part of decode stage 41, allocate stage 42, or execute stage 44. As described in greater detail below, load elision circuitry 72 may increment the counter for an entry in blocklist 54 whenever load elision circuitry 72 detects an address alias condition pertaining to that entry. And when that counter reaches or surpasses the threshold, load elision circuitry 72 stops skipping the corresponding load-protect instruction. Thus, as shown at block 332, if the IP for the present load-protect instruction is listed in blocklist 54 and the counter for that IP is greater than a predetermined threshold, load elision circuitry 72 causes execute stage 44 to execute that load-protect instruction without skipping that instruction. And as shown at block 360, load elision circuitry 72 updates retire LPT 52 for the target register with the source address and sets that entry to active. Such updates to retire LPT 52 may be performed as part of memory stage 46. As shown at block 354, instruction pipeline 30 may then retire the load-protect instruction, and the process may return to block 310, with instruction pipeline 30 fetching and decoding the next instruction.

However, referring again to block 330, if the IP for the present load-protect instruction is not listed in blocklist 54, or if the counter for that IP is not greater than the predetermined threshold, load elision circuitry 72 may then check allocate LPT 50 to determine whether the entry for the target register is active, as shown at blocks 334 and 340. If that entry is active, load elision circuitry 72 may then determine whether the IP in that entry matches the IP of the current load-protect instruction, as shown at block 350. If the IPs match, load elision circuitry 72 may then cause execute stage 44 to skip that load-protect instruction, as shown at block 352. As shown at blocks 353 and 354, instruction pipeline 30 may also mark the load-protect instruction as complete and retire the load-protect instruction. The process may then return to block 310.

However, referring again to blocks 340 and 350, if the relevant entry is not active, or if the IPs do not match, load elision circuitry 72 may update allocate LPT 50 to mark the entry for the target register as active and to identify the IP of the load-protect instruction, as shown at block 356. As shown at block 358, load elision circuitry 72 may also cause instruction pipeline 30 to execute the load-protect instruction. Also, as shown at block 360, load elision circuitry 72 may update the entry for the target register in retire LPT 52 with the source address from the load-protect instruction, and load elision circuitry 72 may set that entry to active. As shown at block 354, instruction pipeline 30 may then retire the load-protect instruction, and the process may return to block 310, with instruction pipeline 30 fetching and decoding the next instruction.

In one embodiment or scenario, the operations of block 320 may be performed as part of decode stage 41 or allocate stage 42; the operations of blocks 330, 334, 340, 350, 352-353, and 356 may be performed as part of allocate stage 42 or execute stage 44; the operations of block 358 may be performed as part of execute stage 44; the operations of block 360 may be performed as part of memory stage 46; and the operations of block 354 may be performed as part of writeback stage 48.

Referring again to block 320, as indicated above, if the decoded instruction is not a load-protect instruction, the process may pass through page connector B to FIG. 5B. As shown at block 410, load elision circuitry 72 may then determine whether the instruction is a store instruction. If the instruction is a store instruction, load elision circuitry 72 may then determine whether the destination address matches the source address of any active entries in retire LPT 52, as shown at block 420. Thus, load elision circuitry 72 detects a may-alias store that is updating data at an address that was the source address of an active load-protect instruction. Accordingly, as shown at block 422, if the destination address of the store instruction matches the source address of an active entry, load elision circuitry 72 marks the store instruction for fault at retirement, and load elision circuitry 72 increments the counter in blocklist 54 for the IP of the associated load-protect instruction. For instance, to mark the instruction for fault, load elision circuitry 72 may update an indicator that is carried by the instruction (or by a micro-operation for the instruction) to indicate that fault processing is to be performed after the instruction is retired.

As shown at block 434, execute stage 44 may then execute the store instruction. As shown at block 440, load elision circuitry 72 may then determine whether the instruction has been marked for clearance of the corresponding retire LPT entry (as described in greater detail below with regard to block 432). If the instruction is marked for clearance of the corresponding retire LPT entry, load elision circuitry 72 may then clear (or mark as inactive) the entry in retire LPT 52 for the destination register, as shown at block 442

As shown at block 444, instruction pipeline 30 may then retire the instruction. As shown at block 450, load elision circuitry 72 may then determine whether the instruction has been marked for fault (e.g., as described above with regard to block 422, or as described below with regard to block 512 of FIG. 6). If the instruction is marked for fault, load elision circuitry 72 may then cause instruction pipeline 30 to process the fault by flushing the pipeline, clearing (or marking as inactive) any relevant entries in allocate LPT 50 and retire LPT 52, and restarting execution at the next IP following the instruction that was just retired, as shown at block 452. In particular, flushing instruction pipeline 30 involves discarding any newer instructions from instruction pipeline 30 (i.e., any instructions in instruction pipeline 30 that follow the instruction that was marked for fault). Consequently, fault processing causes instruction pipeline 30 to restart at the next instruction following the instruction that was marked for fault. The relevant entries in allocate LPT 50 and retire LPT 52 that load elision circuitry 72 clears are any active entry for a register with a source address that was hit by the store or the snoop. In other words, any entry with an index that had the hit from the store or the snoop will be invalidated from both LPTs. The process of FIG. 5B may then return to block 310 of FIG. 5A via page connector A.

However, referring again to block 410 of FIG. 5B, if the instruction is not a store instruction, load elision circuitry 72 may determine whether the instruction updates a destination register that is protected by an active entry in allocate LPT 50, as shown at block 430. If such a register is being updated, load elision circuitry 72 may clear (or mark as inactive) the allocate LPT 50 entry for that register, and load elision circuitry 72 may mark the instruction for clearance of the entry in retire LPT 52 for that destination register, as shown at block 432. For instance, to mark the instruction for clearance, load elision circuitry 72 may update an indicator that is carried by the instruction (or by a micro-operation for the instruction) to indicate that the corresponding entry in retire LPT 52 is to be cleared. As shown at block 434, execute stage 44 may then execute the instruction, and processing may continue as described above.

In one embodiment or scenario, the operations of block 410 may be performed as part of decode state 41 or allocate stage 42; the operations of blocks 430 and 432 may be performed as part of allocate stage 42 or execute stage 44; the operations of block 434 may be performed as part of execute stage 44; the operations of blocks 420 and 422 may be performed as part of allocate stage 42 or memory stage 46; and the operations of blocks 440, 442, 444, 450, and 452 may be performed as part of memory stage 46.

Thus, once a load-protect instruction has loaded data from a source address into a destination register, load elision circuitry 72 may cause subsequent iterations of that load-protect instruction to be elided, as long as (a) no updates are made to that source address (as determined in block 420), (b) no updates are made to that destination register (as determined in block 430), and (c) that load-protect instruction does not get added to blocklist 54.

In addition, coherency controller 74 may prevent operations from other threads or processes from causing improper results.

Figure 6:
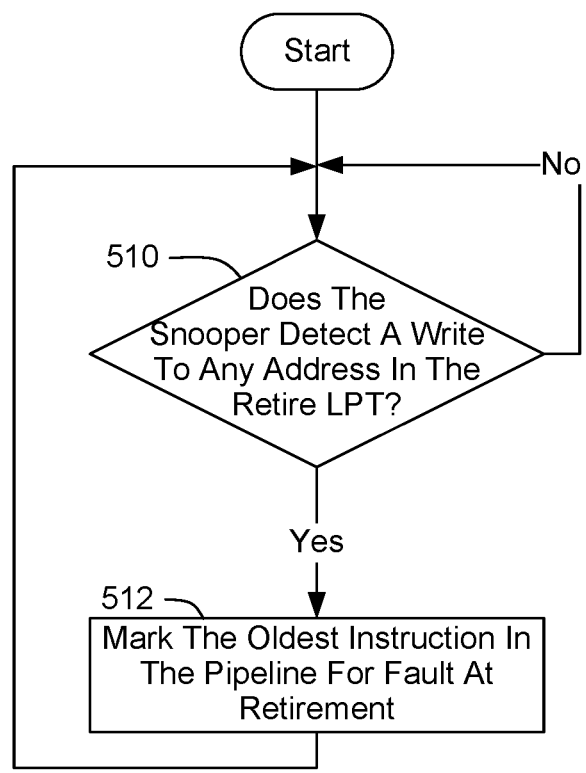
FIG. 6 presents a flowchart of an example embodiment of a process for handling snoops associated with optimized memory-to-register operations.

FIG. 6 presents a flowchart of an example embodiment of a process for handling snoops associated with optimized memory-to-register operations. The process of FIG. 6 may be performed by coherency controller 74, and it may start with coherency controller 74 determining whether a bus transaction (or "snoop") involves a write to any active address in retire LPT 52 (i.e., a write to any address listed in an active entry in retire LPT 52), as shown at block 510. In response to detecting a bus transaction that involves a write to an active address in retire LPT 52, coherency controller 74 may mark the oldest instruction in instruction pipeline 30 for fault at retirement, as shown at block 512. The process may then return to block 510, with coherency controller 74 continuing to monitor for bus transactions which write to any active address in retire LPT 52 and responding accordingly, as indicated above. Thus, if an external snoop hits any active address in retire LPT 52, coherency controller 74 may mark the oldest instruction in instruction pipeline 30 for fault at retirement. And when an instruction in instruction pipeline 30 is marked for fault at retirement, that fault may cause processor 12 to perform the operations shown in FIG. 5B following block 422. For instance, when an instruction that has been marked for fault is retired, processor 12 may respond by flushing instruction pipeline 30, clearing any relevant entries in the LPTs, and restarting execution at the next IP, as shown at block 452. As indicated above, the relevant entries to be cleared are any active entry in retire LPT 52 with a source address that was hit by the store or the snoop, and the corresponding entry (i.e., the entry with the same index) in allocate LPT 50.

Thus, coherency controller 74 monitors transactions affecting storage locations such as caches and load buffers, and coherency controller 74 inserts faults which cause instruction pipeline 30 to be flushed and restarted at the next instruction following whichever instruction was oldest in instruction pipeline 30 when such a transaction was detected. Consequently, if a different thread writes to an address that is protected by an active entry in retire LPT 52, coherency controller 74 marks the oldest instruction in instruction pipeline 30 for fault at retirement and clears any relevant entries in the LPTs, thereby preventing any younger load-protect instructions in the pipeline from being elided.

As has been described, a processor supports a load-protect instruction which enables a data processing system to skip or elide execution of load instructions that a conventional data processing system would be unable to elide without risking improper results due to potential complications, such as may-alias stores. In addition, as indicated above, a compiler may replace conventional load instructions with load-protect instructions in a way that enables a processor that does not fully support load-protect instruction to simply treat the load-protect instructions as load instructions. Consequently, the generated code may be similar to the original code, except for the difference in opcode, thus making the optimization easier to analyze. Consequently, an older data processing system may be able to execute the generated code by simply disregarding the special property of the load-protect instruction. Additionally, the hardware logic in the processor to support load elision may be implemented using circuitry that is not overly large and complex.

Additional Embodiments

Figure 7:
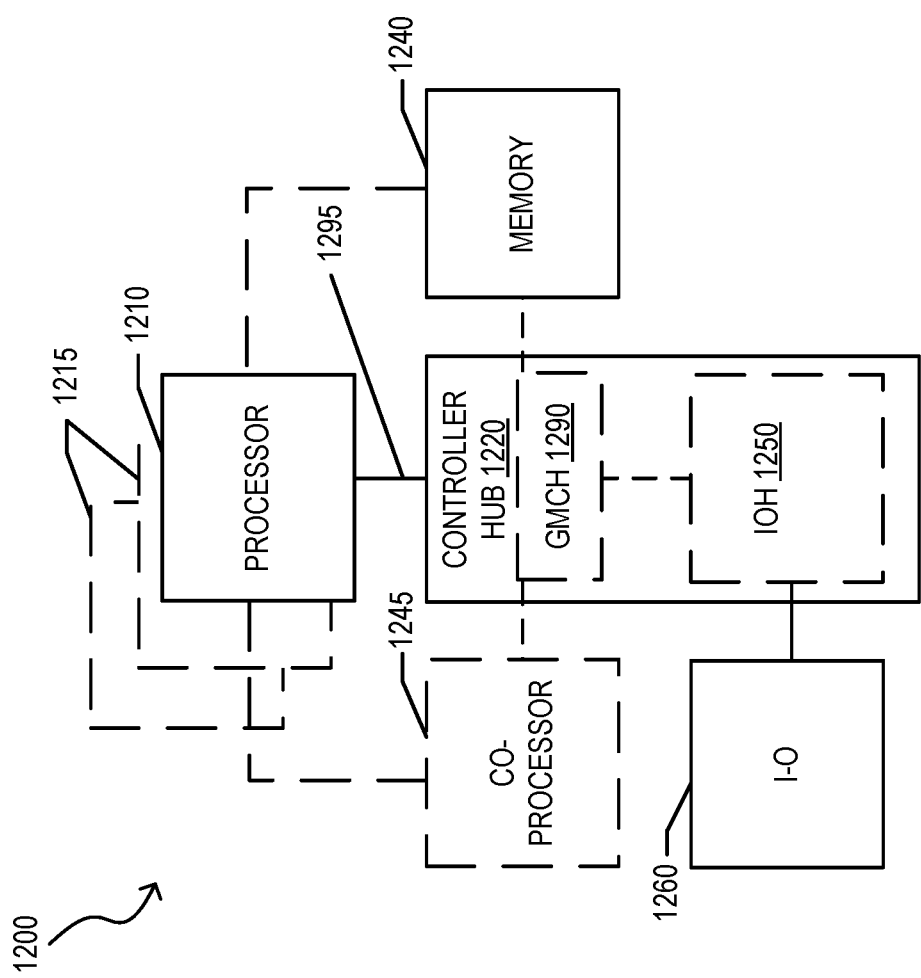
FIG. 7 is a block diagram of a system according to one or more embodiments.

FIG. 7 is a block diagram of a system 1200 according to one or more embodiments. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 7 with broken lines. Each processor 1210, 1215 may include one or more processing cores and may be some version of processor 12.

The memory 1240 may be, for example, dynamic random-access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quick-Path Interconnect (QPI), or similar connection 1295.

In one embodiment, the coprocessor 1245 is a special-purpose processor, such as, for example, a high-throughput MIC processor, a network or communication processor, a compression engine, graphics processing unit (GPU), a general purpose GPU (GPGPU), an embedded processor, a BW accelerator, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 8:
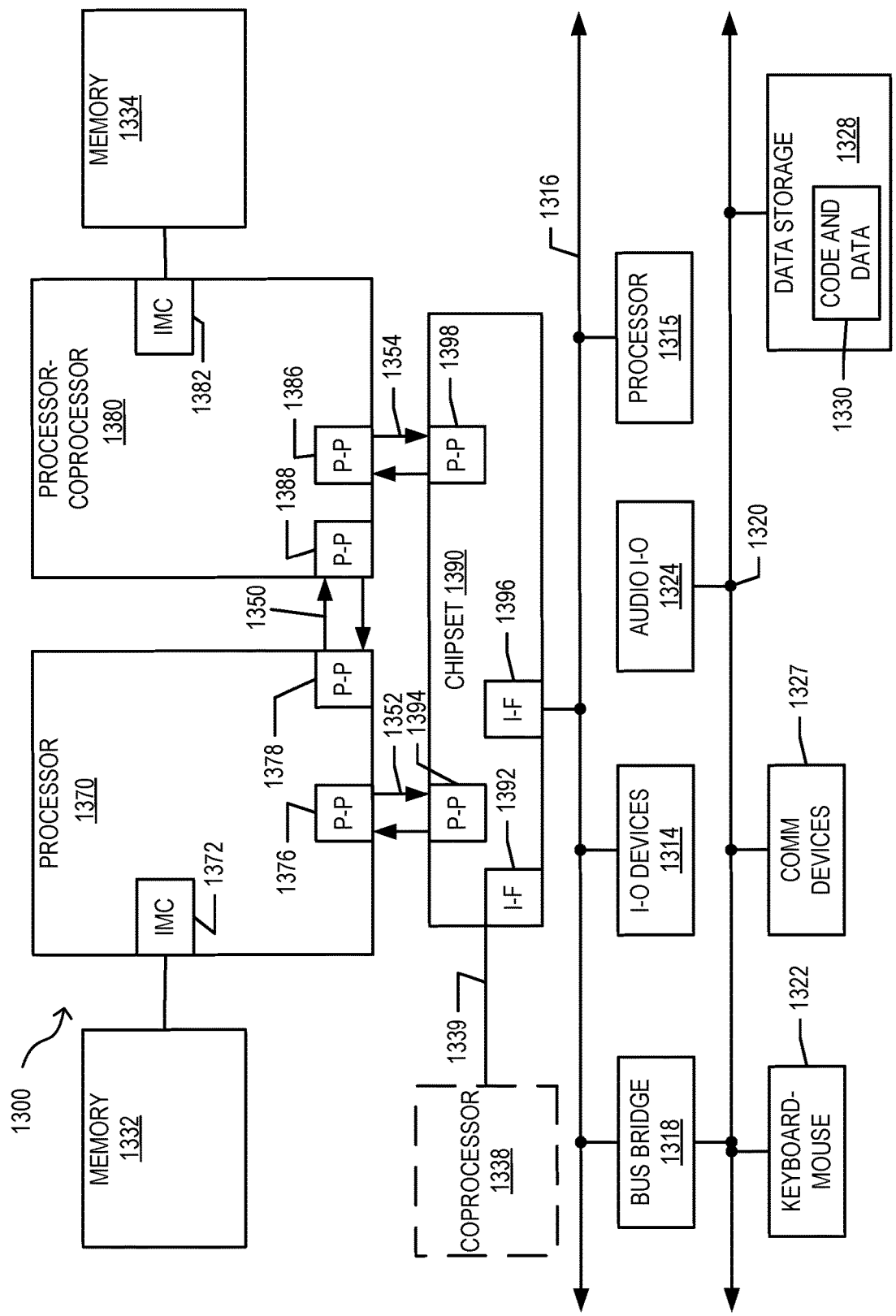
FIG. 8 is a block diagram of a first more specific exemplary system according to one or more embodiments.

FIG. 8 is a block diagram of a first more specific exemplary system 1300 according to one or more embodiments. As shown in FIG. 8, multiprocessor system 1300 is a point-to-point interconnect system, and includes a first processor 1370 and a second processor 1380 coupled via a point-to-point interconnect 1350. Each of processors 1370 and 1380 may be some version of processor 12. In one embodiment, processors 1370 and 1380 are respectively processors 1210 and 1215, while coprocessor 1338 is coprocessor 1245. In another embodiment, processors 1370 and 1380 are respectively processor 1210 and coprocessor 1245. Alternatively, processor 1380 may be a BW accelerator.

Processors 1370 and 1380 are shown including integrated memory controller (IMC) units 1372 and 1382, respectively. Processor 1370 also includes as part of its bus controller unit's point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 8, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 8, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays (FPGAs), or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 8, a system may implement a multi-drop bus or other such architecture.

Figure 9:
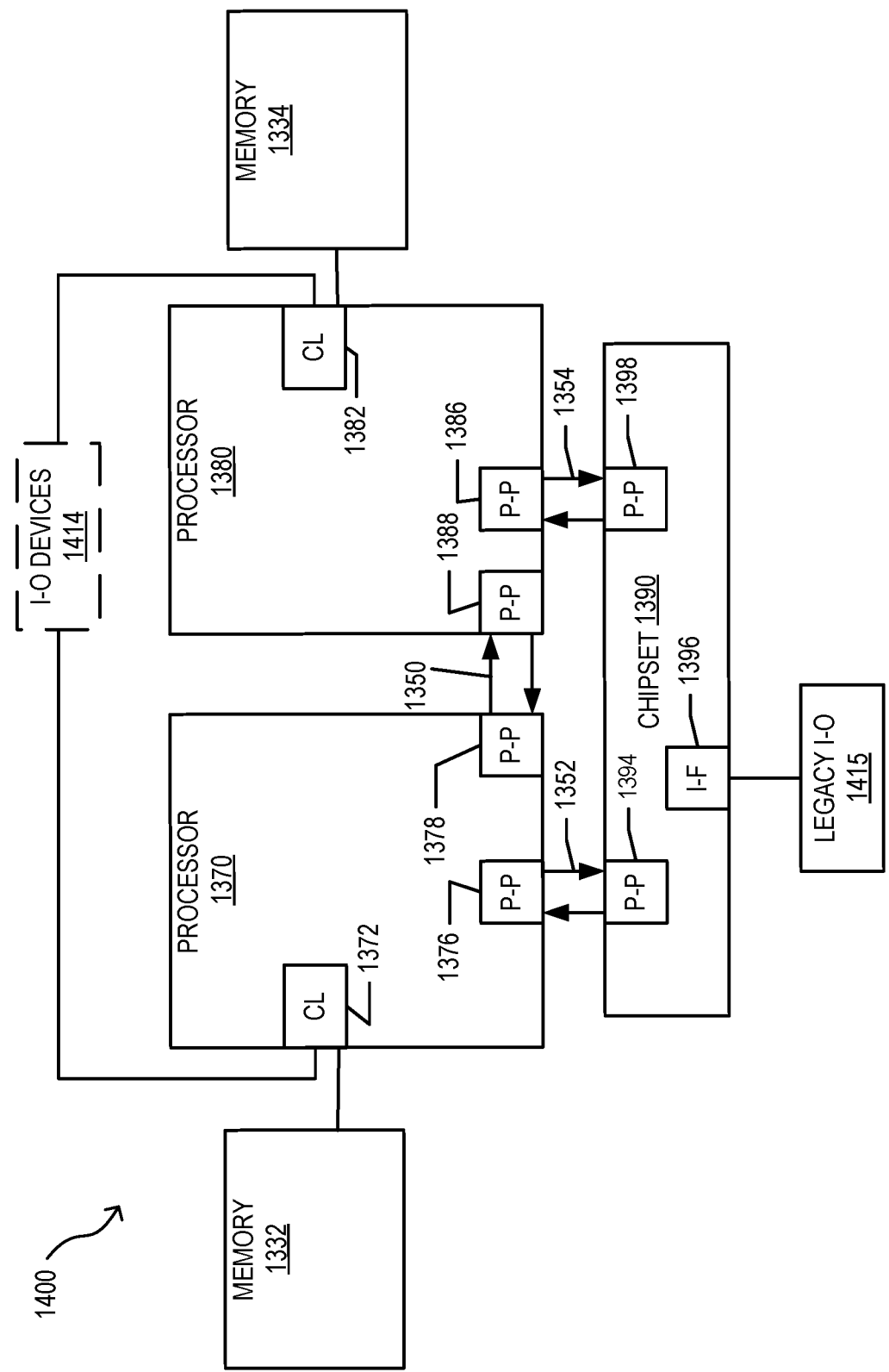
FIG. 9 is a block diagram of a second more specific exemplary system according to one or more embodiments.

FIG. 9 is a block diagram of a second more specific exemplary system 1400 in accordance with on one or more embodiments. Certain aspects of FIG. 8 have been omitted from FIG. 9 in order to avoid obscuring other aspects of FIG. 9.

FIG. 9 illustrates that the processors 1370, 1380 may include integrated memory and I/O control logic ("CL") 1372 and 1382, respectively. Thus, the CL 1372, 1382 include integrated memory controller units and include I/O control logic. FIG. 9 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 10:
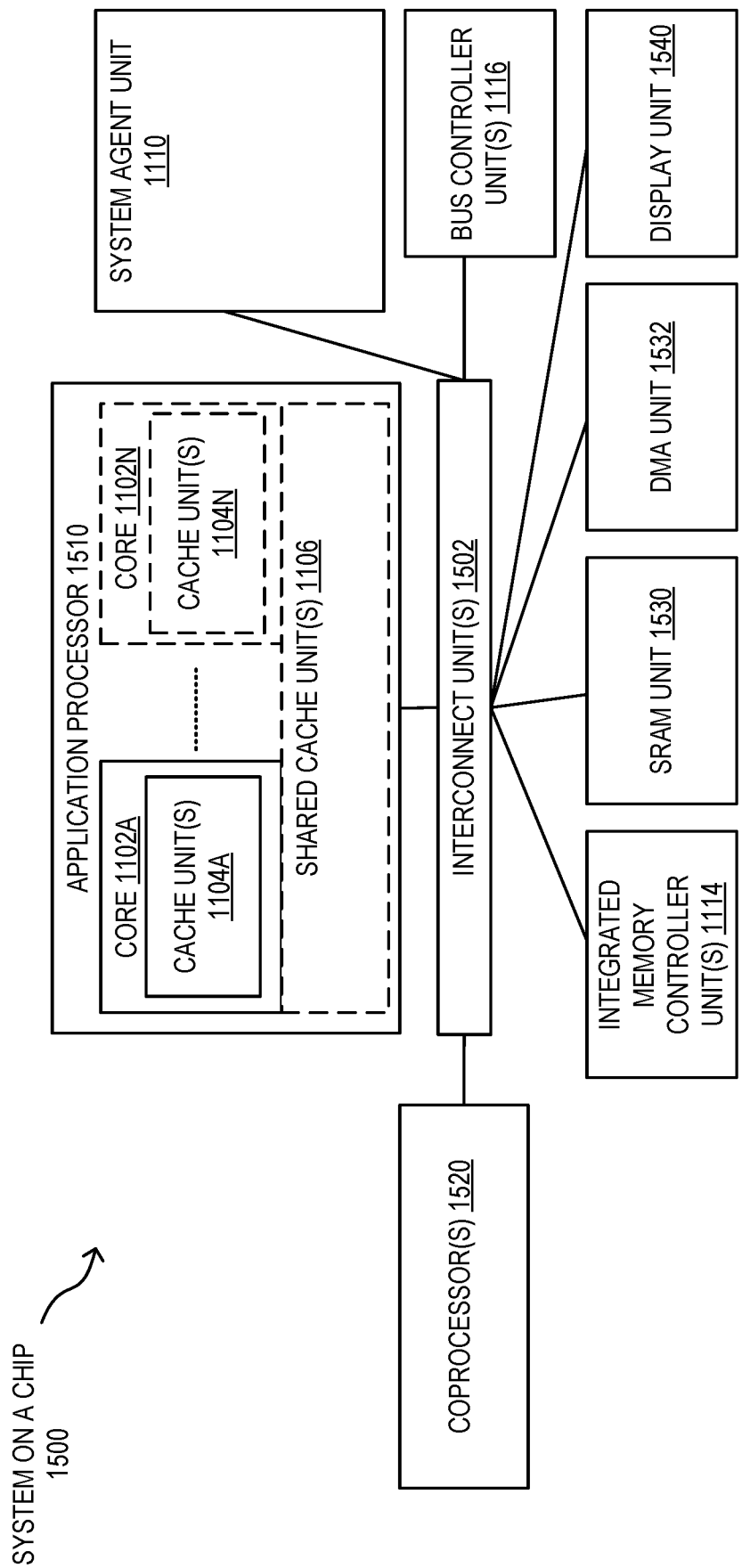
FIG. 10 is a block diagram of a system on a chip according to one or more embodiments.

FIG. 10 is a block diagram of a system on a chip (SoC) 1500 according to one or more embodiments. Dashed lined boxes are optional features on more advanced SoCs. In FIG. 10, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, a video processor, and/or a BW accelerator; a static random-access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, security processor, or the like.

Embodiments also include the following examples:

Example A1 is an apparatus comprising decoder circuitry to decode an instruction to load data into a register, the instruction to include a field for an opcode to indicate a protected load operation, a source field for source memory address information, and a destination field to identify a destination register. The apparatus also comprises memory to store an allocate LP data structure to store an entry for the identified destination register, the entry to comprise (a) an IP field to store an IP for the instruction and (b) a status field to indicate when the entry has active status. The apparatus also comprises load elision circuitry to: (a) in response to decoding of the instruction from the IP, use the allocate LP data structure to determine whether the identified destination register has active status for the IP; (b) in response to determining that the identified destination register has active status for the IP, cause the instruction to be elided; and (c) in response to determining that the identified destination register does not have active status for the IP, cause the instruction to be executed.

Example A2 is an apparatus according to Example A1, wherein the load elision circuitry is further to, in response to determining that the identified destination register does not have active status for the IP, update the entry in the allocate LP data structure to identify the IP of the instruction and to set the status of the entry to active.

Example A3 is an apparatus according to Example A1, fur comprising memory to store a retire LP data structure to store an entry for the identified destination register, the entry to comprise (a) a source field to identify a source address and (b) a status field to indicate when the entry has active status. Also, the load elision circuitry is further to, in response to execution of the instruction, update the entry in the retire LP data structure to identify the source address and to set the status as active. Example A3 may also include the features of Example A2.

Example A4 is an apparatus according to Example A3, wherein the load elision circuitry is further to (a) in response to decoding of a store instruction, determine whether the store instruction involves a destination address that is protected by an active entry in the retire LP data structure; and (b) in response to determining that the store instruction involves a destination address that is protected by an active entry in the retire LP data structure, mark the store instruction for fault at retirement.

Example A5 is an apparatus according to Example A4, further comprising an instruction pipeline comprising the decoder circuitry. Also, to process the store instruction marked for fault at retirement comprises (a) to cause instructions that are newer than the store instruction to be flushed from the instruction pipeline, and (b) to cause execution to restart at the next IP following the IP of the store instruction that was marked for fault.

Example A6 is an apparatus according to Example A5, wherein, in response to determining that the store instruction involves a destination address that is protected by an active entry in the retire LP data structure, the load elision circuitry is further to (a) update the retire LP data structure to mark that entry as inactive; and (b) update a corresponding entry in the allocate LP data structure to mark that corresponding entry as inactive.

Example A7 is an apparatus according to Example A1, wherein the load elision circuitry is further to (a) in response to decoding of a second instruction, determine whether the second instruction involves a destination register that is protected by an active entry in the allocate LP data structure; and (b) in response to determining that the second instruction involves a destination register that is protected by an active entry in the allocate LP data structure, increment a blocklist counter for the instruction.

Example A8 is an apparatus according to Example A7, wherein the apparatus comprises a processor comprising the decoder circuitry, the memory, and the load elision circuitry. Also, the load elision circuitry is to cause the processor to elide the instruction only if the blocklist counter for the instruction has not met a predetermined threshold value for discontinuing elision of instructions.

Example A9 is an apparatus according to Example A1, wherein the apparatus comprises a processor, the processor comprises an instruction pipeline, and the instruction pipeline comprises the decoder circuitry, the memory, the load elision circuitry, and an allocate stage. Also, at least some of the load elision circuitry is part of the allocate stage. Example A9 may also include the features of any one or more of Examples A2-A8.

Example A10 is an apparatus according to Example A9, wherein the load elision circuitry in the allocate stage is to update the allocate LP data structure.

Example A11 is an apparatus according to Example A10, further comprising memory to store a retire LP data structure to store an entry for the identified destination register, the entry to comprise (a) a source field to identify a source address and (b) a status field to indicate when the entry has active status. Also, the load elision circuitry in the allocate stage is further to, in response to execution of the instruction, update the entry in the retire LP data structure to identify the source address and to set the status as active.

Example B1 is a data processing system comprising NVS, a processor in communication with the NVS, and decoder circuitry in the processor. The decoder circuitry is to decode an instruction to load data into a register, the instruction to include a field for an opcode to indicate a protected load operation, a source field for source memory address information, and a destination field to identify a destination register. The data processing system also comprises memory in the processor to store an allocate LP data structure to store an entry for the identified destination register, the entry to comprise (a) an instruction pointer (IP) field to store an IP for the instruction and (b) a status field to indicate when the entry has active status. The process comprises load elision circuitry to (a) in response to decoding of the instruction from the IP, use the allocate LP data structure to determine whether the identified destination register has active status for the IP; (b) in response to determining that the identified destination register has active status for the IP, cause the instruction to be elided; and (c) in response to determining that the identified destination register does not have active status for the IP, cause the instruction to be executed.

Example B2 is a data processing system according to Example B1, wherein the load elision circuitry is further to, in response to determining that the identified destination register does not have active status for the IP, update the entry in the allocate LP data structure to identify the IP of the instruction and to set the status of the entry to active.

Example B3 is a data processing system according to Example B1, wherein the processor comprises memory to store a retire LP data structure to store an entry for the identified destination register, the entry to comprise (a) a source field to identify a source address and (b) a status field to indicate when the entry has active status. Also, the load elision circuitry is further to, in response to execution of the instruction, update the entry in the retire LP data structure to identify the source address and to set the status as active. Example B3 may also include the features of Example B2.

Example B4 is a data processing system according to Example B3, wherein the load elision circuitry is further to, (a) in response to decoding of a store instruction, determine whether the store instruction involves a destination address that is protected by an active entry in the retire LP data structure; and (b) in response to determining that the store instruction involves a destination address that is protected by an active entry in the retire LP data structure, mark the store instruction for fault at retirement.

Example B5 is a data processing system according to Example B1, wherein the load elision circuitry is further to (a) in response to decoding of a second instruction, determine whether the second instruction involves a destination register that is protected by an active entry in the allocate LP data structure; and (b) in response to determining that the second instruction involves a destination register that is protected by an active entry in the allocate LP data structure, increment a blocklist counter for the instruction. Example B5 may also include the features of any one or more of Examples B2-B4.

Example B6 is a data processing system according to Example B5, wherein the load elision circuitry is to cause the processor to elide the instruction only if the blocklist counter for the instruction has not met a predetermined threshold value for discontinuing elision of instructions.

Example B7 is a data processing system according to Example B 1, wherein the NVS comprises optimized code to be executed by the processor, and the optimized code comprises the instruction to load data into a register. Example B8 may also include the features of any one or more of Examples B2-B6.

Example B8 is a data processing system according to example B7, wherein the NVS further comprises a compiler, the optimized code comprises object code that was generated by the compiler based on source code, and the instruction to load data into a register comprises an optimization instruction that was generated by the compiler to be processed in place of a load instruction in the source code.

Example C1 is an apparatus comprising a non-transitory machine-accessible medium; and instructions in the machine-accessible medium, wherein the instructions comprise an instruction which, when processed by an instruction pipeline of a processor, causes the processor to, in response to decoding of the instruction, consult an allocate LP data structure that includes multiple entries for multiple respective registers, to determine whether the allocate LP data structure contains an active entry for the instruction. The instructions also cause the processor to, in response to a determination that the allocate LP data structure contains an active entry for the instruction, elide the instruction. The instructions also cause the processor to, in response to a determination that the allocate LP data structure does not contain an active entry for the instruction, (a) execute the instruction and (b) update the allocate LP data structure to include an active entry for the instruction.

Example C2 is an apparatus according to Example C1, wherein the instructions further comprise a store instruction which, when processed by the instruction pipeline, causes the processor to (a) determine whether the store instruction involves a destination address that is protected by an active entry in a retire LP data structure; and (b) in response to determining that the store instruction involves a destination address that is protected by an active entry in the retire LP data structure, (i) update the retire LP data structure to mark that entry as inactive, and (ii) flush instructions that are newer than the store instruction from the instruction pipeline.

Example C3 is an apparatus according to Example C1, wherein the machine-accessible medium comprises a compiler which, when executed, generates optimized code based on source code. Also, the operation of generating optimized code based on source code comprises including load-protect instructions in the optimized code, to be executed in place of load instructions in the source code. Example C3 may also include the features of Example C2.

In light of the principles and example embodiments described in the present disclosure by text and/or illustration, one with skill in the art will recognize that the described embodiments can be modified in arrangement and detail without departing from the principles described herein. Furthermore, this disclosure uses expressions such as "one embodiment" and "another embodiment" to describe embodiment possibilities. However, those expressions are not intended to limit the scope of this disclosure to particular embodiment configurations. For instance, those expressions may reference the same embodiment or different embodiments, and those different embodiments are combinable into other embodiments.

Additionally, the present teachings may be used to advantage in many different kinds of data processing systems. Such data processing systems may include, without limitation, mainframe computers, mini-computers, supercomputers, high-performance computing systems, computing clusters, distributed computing systems, personal computers (PCs), workstations, servers, client-server systems, portable computers, laptop computers, tablet computers, entertainment devices, audio devices, video devices, audio/video devices (e.g., televisions and set-top boxes), handheld devices, smartphones, telephones, personal digital assistants (PDAs), wearable devices, vehicular processing systems, accelerators, systems on a chip (SoCs), and other devices for processing and/or transmitting information. Accordingly, unless explicitly specified otherwise or required by the context, references to any particular type of data processing system (e.g., a PC) should be understood as encompassing other types of data processing systems, as well. A data processing system may also be referred to as an "apparatus." The components of a data processing system may also be referred to as "apparatus."

Also, according to the present disclosure, a device may include instructions and other data which, when accessed by a processor, cause the device to perform particular operations. For purposes of this disclosure, instructions or other data which cause a device to perform operations may be referred to in general as "software" or "control logic". Software that is used during a boot process may be referred to as "firmware." Software that is stored in non-volatile memory may also be referred to as "firmware." Software may be organized using any suitable structure or combination of structures. Accordingly, terms like program and module may be used in general to cover a broad range of software constructs, including, without limitation, application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Also, embodiments may include software that is implemented using any suitable operating environment and programming language (or combination of operating environments and programming languages). For example, program code may be implemented in a compiled language, in an interpreted language, in a procedural language, in an object-oriented language, in assembly language, in machine language, or in any other suitable language.

A medium which contains data and which allows another component to obtain that data may be referred to as a "machine-accessible medium" or a "machine-readable medium." Accordingly, embodiments may include machine-readable media containing instructions for performing some or all of the operations described herein. Such media may be referred to in general as "apparatus" and in particular as "program products." In one embodiment, software for multiple components may be stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. The machine-readable media for some embodiments may include, without limitation, tangible non-transitory storage components such as magnetic disks, optical disks, magneto-optical disks, dynamic RAM (DRAM), static RAM (SRAM), non-volatile RAM (NVRAM), read-only memory (ROM), phase change memory (PCM), solid state drives (SSDs), etc., as well as processors, controllers, and other components that include data storage facilities (i.e., "storage"). For purposes of this disclosure, the term "ROM" may be used in general to refer to non-volatile memory devices such as erasable programmable ROM (EPROM), electrically erasable programmable ROM (EEPROM), flash ROM, flash memory, etc. Likewise, the term "memory" may be used in general to refer to DRAM, SRAM, NVRAM, ROM, PCM, registers, and similar types of storage.

Also, operations that are described as being performed on one particular device in one embodiment may, in other embodiments, be performed by one or more other devices. Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing the described functionality may be implemented in hardware logic circuitry, such as with an application-specific integrated circuit (ASIC) or with a programmable gate array (PGA). Similarly, some or all of the control logic may be implemented as microcode in an integrated circuit chip. Also, terms such as "circuit" and "circuitry" may be used interchangeably herein. Those terms and terms like "logic" may be used to refer to analog circuitry, digital circuitry, processor circuitry, microcontroller circuitry, hardware logic circuitry, hard-wired circuitry, programmable circuitry, state machine circuitry, any other type of hardware component, or any suitable combination of hardware components.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as "signals." Also, for purpose of this disclosure, the term "processor" denotes a hardware component that is capable of executing software. For instance, a processor may be implemented as a central processing unit (CPU) or as any other suitable type of processing element. A CPU may include one or more processing cores. A processor package may also be referred to as a "processor." And a device may include one or more processors.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer-readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine-readable medium and supplied to various customers or manufacturing facilities to load into the fabrication machines that make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

In view of the wide variety of useful permutations that may be readily derived from the example embodiments described herein, this detailed description is intended to be illustrative only, and should not be construed as limiting the scope of coverage.

What is claimed is:

1. An apparatus comprising:
decoder circuitry to decode an instruction to load data into a register, the instruction to include a field for an opcode to indicate a protected load operation, a source field for source memory address information, and a destination field to identify a destination register;
memory to store an allocate load-protect (LP) data structure to store an entry for the identified destination register, the entry to comprise (a) an instruction pointer (IP) field to store an IP for the instruction and (b) a status field to indicate when the entry has active status; and
load elision circuitry to:
in response to decoding of the instruction from the IP, use the allocate LP data structure to determine whether the identified destination register has active status for the IP;
in response to determining that the identified destination register has active status for the IP, cause the instruction to be elided; and
in response to determining that the identified destination register does not have active status for the IP, cause the instruction to be executed.

2. An apparatus according to claim 1, wherein the load elision circuitry is further to, in response to determining that the identified destination register does not have active status for the IP, update the entry in the allocate LP data structure to identify the IP of the instruction and to set the status of the entry to active.

3. An apparatus according to claim 1, further comprising:
memory to store a retire LP data structure to store an entry for the identified destination register, the entry to comprise (a) a source field to identify a source address and (b) a status field to indicate when the entry has active status; and
wherein the load elision circuitry is further to, in response to execution of the instruction, update the entry in the retire LP data structure to identify the source address and to set the status as active.

4. An apparatus according to claim 3, wherein the load elision circuitry is further to:
in response to decoding of a store instruction, determine whether the store instruction involves a destination address that is protected by an active entry in the retire LP data structure; and
in response to determining that the store instruction involves a destination address that is protected by an active entry in the retire LP data structure, mark the store instruction for fault at retirement.

5. An apparatus according to claim 4, further comprising:
an instruction pipeline comprising the decoder circuitry; and
wherein to process the store instruction marked for fault at retirement comprises:
to cause instructions that are newer than the store instruction to be flushed from the instruction pipeline; and
to cause execution to restart at the next IP following the IP of the store instruction that was marked for fault.

6. An apparatus according to claim 5, wherein, in response to determining that the store instruction involves a destination address that is protected by an active entry in the retire LP data structure, the load elision circuitry is further to:
update the retire LP data structure to mark that entry as inactive; and
update a corresponding entry in the allocate LP data structure to mark that corresponding entry as inactive.

7. An apparatus according to claim 1, wherein the load elision circuitry is further to:
in response to decoding of a second instruction, determine whether the second instruction involves a destination register that is protected by an active entry in the allocate LP data structure; and
in response to determining that the second instruction involves a destination register that is protected by an active entry in the allocate LP data structure, increment a blocklist counter for the instruction.

8. An apparatus according to claim 7, wherein:
the apparatus comprises a processor comprising the decoder circuitry, the memory, and the load elision circuitry; and
the load elision circuitry is to cause the processor to elide the instruction only if the blocklist counter for the instruction has not met a predetermined threshold value for discontinuing elision of instructions.

9. An apparatus according to claim 1, wherein:
the apparatus comprises a processor;
the processor comprises an instruction pipeline;
the instruction pipeline comprises the decoder circuitry, the memory, the load elision circuitry, and an allocate stage; and
at least some of the load elision circuitry is part of the allocate stage.

10. An apparatus according to claim 9, wherein the load elision circuitry in the allocate stage is to update the allocate LP data structure.

11. An apparatus according to claim 10, further comprising:
memory to store a retire LP data structure to store an entry for the identified destination register, the entry to comprise (a) a source field to identify a source address and (b) a status field to indicate when the entry has active status; and
wherein the load elision circuitry in the allocate stage is further to, in response to execution of the instruction, update the entry in the retire LP data structure to identify the source address and to set the status as active.

12. A data processing system comprising:
non-volatile storage (NVS); and
a processor in communication with the NVS;
decoder circuitry in the processor, the decoder circuitry to decode an instruction to load data into a register, the instruction to include a field for an opcode to indicate a protected load operation, a source field for source memory address information, and a destination field to identify a destination register;
memory in the processor, the memory to store an allocate load-protect (LP) data structure to store an entry for the identified destination register, the entry to comprise (a) an instruction pointer (IP) field to store an IP for the instruction and (b) a status field to indicate when the entry has active status; and
load elision circuitry in the processor, the load elision circuitry to:
in response to decoding of the instruction from the IP, use the allocate LP data structure to determine whether the identified destination register has active status for the IP;
in response to determining that the identified destination register has active status for the IP, cause the instruction to be elided; and
in response to determining that the identified destination register does not have active status for the IP, cause the instruction to be executed.

13. A data processing system according to claim 12, wherein the load elision circuitry is further to, in response to determining that the identified destination register does not have active status for the IP, update the entry in the allocate LP data structure to identify the IP of the instruction and to set the status of the entry to active.

14. A data processing system according to claim 12, wherein:
the processor comprises memory to store a retire LP data structure to store an entry for the identified destination register, the entry to comprise (a) a source field to identify a source address and (b) a status field to indicate when the entry has active status; and
wherein the load elision circuitry is further to, in response to execution of the instruction, update the entry in the retire LP data structure to identify the source address and to set the status as active.

15. A data processing system according to claim 14, wherein the load elision circuitry is further to:

in response to decoding of a store instruction, determine whether the store instruction involves a destination address that is protected by an active entry in the retire LP data structure; and in response to determining that the store instruction involves a destination address that is protected by an active entry in the retire LP data structure, mark the store instruction for fault at retirement.

16. A data processing system according to claim 12, wherein the load elision circuitry is further to:

in response to decoding of a second instruction, determine whether the second instruction involves a destination register that is protected by an active entry in the allocate LP data structure; and in response to determining that the second instruction involves a destination register that is protected by an active entry in the allocate LP data structure, increment a blocklist counter for the instruction.

17. A data processing system according to claim 16, wherein the load elision circuitry is to cause the processor to elide the instruction only if the blocklist counter for the instruction has not met a predetermined threshold value for discontinuing elision of instructions.

18. A data processing system according to claim 12, wherein:

the NVS comprises optimized code to be executed by the processor; and the optimized code comprises the instruction to load data into a register.

19. A data processing system according to claim 18, wherein:

the NVS further comprises a compiler;

the optimized code comprises object code that was generated by the compiler based on source code; and the instruction to load data into a register comprises an optimization instruction that was generated by the compiler to be processed in place of a load instruction in the source code.

20. An apparatus comprising:

a non-transitory machine-accessible medium; and instructions in the non-transitory machine-accessible medium, wherein the instructions comprise an instruction having a field for an opcode to indicate a protected load operation, a source field for source memory address information, and a destination field to identify a destination register which, when processed by an instruction pipeline of a processor, causes the processor to:

in response to decoding of the instruction, consult an allocate load-protect (LP) data structure that includes multiple entries for multiple respective registers, each entry of the multiple entries comprising (a) an instruction pointer (IP) field to store an IP for the instruction and (b) a status field to indicate when the entry has active status, to determine whether the allocate LP data structure contains an active entry for the load-protect instruction;

in response to a determination that the allocate LP data structure contains the active entry for the instruction, elide the instruction; and in response to a determination that the allocate LP data structure does not contain the active entry for the instruction, (a) execute the instruction and (b) update the allocate LP data structure to include an active entry for the instruction.

21. An apparatus according to claim 20, wherein the instructions further comprise a store instruction which, when processed by the instruction pipeline, causes the processor to:

determine whether the store instruction involves a destination address that is protected by an active entry in a retire LP data structure; and in response to determining that the store instruction involves a destination address that is protected by an active entry in the retire LP data structure, (a) update the retire LP data structure to mark that entry as inactive, and (b) flush instructions that are newer than the store instruction from the instruction pipeline.

22. An apparatus according to claim 20, wherein:

the machine-accessible medium comprises a compiler which, when executed, generates optimized code based on source code; and the operation of generating optimized code based on source code comprises including load-protect instructions in the optimized code, to be executed in place of load instructions in the source code.

* * * * *